(12) United States Patent
Rodgers et al.

(10) Patent No.: US 9,531,715 B1
(45) Date of Patent: Dec. 27, 2016

(54) METHOD AND SYSTEM FOR PROTECTING CREDENTIALS

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 0 days.

(21) Appl. No.: 14/705,767

(22) Filed: May 6, 2015

Related U.S. Application Data

(60) Provisional application No. 61/989,957, filed on May 7, 2014.

(51) Int. Cl.
*H04L 9/32* (2006.01)
*H04L 29/06* (2006.01)

(52) U.S. Cl.
CPC ......... *H04L 63/0884* (2013.01); *H04L 63/168* (2013.01)

(58) Field of Classification Search
CPC ...... H04L 63/08; H04L 63/10; H04L 63/0281; H04L 63/0272; H04L 63/0884; H04L 63/168; G06F 21/44; G06F 21/60; G06F 21/606
USPC .......... 726/2–6, 12, 15, 27–30; 713/150–153
See application file for complete search history.

(56) References Cited

U.S. PATENT DOCUMENTS

| | | | |
|---|---|---|---|
| 7,870,153 B2* | 1/2011 | Croft | G06F 3/1415 707/694 |
| 7,886,023 B1 | 2/2011 | Johnson | |
| 8,010,679 B2* | 8/2011 | Low | G06F 3/1415 709/217 |

(Continued)

*Primary Examiner* — Hosuk Song
(74) *Attorney, Agent, or Firm* — Osha Liang LLP

(57) ABSTRACT

A method and system for accessing local resources. The method includes intercepting, by a proxy, a request from an application to access a local resource, where the application is executing in an application virtual machine (AVM) on a computing device and where the proxy is executing on a service virtual machine (SVM) on the computing device. The method further includes replacing, by the proxy, a placeholder credential in the request with a local resource credential to obtain a second request. The method also includes sending, by the proxy, the second request to the local resource, receiving, by the proxy, a response to the second request from the local resource, and providing the response to the application.

19 Claims, 9 Drawing Sheets

(56) References Cited

U.S. PATENT DOCUMENTS

| | | | |
|---|---|---|---|
| 8,051,180 B2 * | 11/2011 | Mazzaferri | G06F 3/1415 |
| | | | 709/227 |
| 8,438,654 B1 * | 5/2013 | von Eicken | G06F 21/53 |
| | | | 709/217 |
| 8,572,400 B2 | 10/2013 | Lin et al. | |
| 8,607,054 B2 * | 12/2013 | Ramarathinam | H04L 63/0807 |
| | | | 709/227 |
| 2010/0088405 A1 | 4/2010 | Huang et al. | |
| 2011/0162042 A1 | 6/2011 | Xiao et al. | |
| 2012/0151209 A1 | 6/2012 | Visnyak et al. | |
| 2013/0185715 A1 * | 7/2013 | Dunning | H04L 41/0803 |
| | | | 718/1 |
| 2013/0205376 A1 | 8/2013 | Narasimha et al. | |
| 2014/0281500 A1 | 9/2014 | Ignatchenko | |
| 2014/0344475 A1 | 11/2014 | Chen et al. | |
| 2015/0007250 A1 | 1/2015 | Dicato, Jr. et al. | |
| 2015/0215308 A1 * | 7/2015 | Manolov | H04L 63/0823 |
| | | | 709/229 |
| 2016/0021055 A1 | 1/2016 | Krzywonos et al. | |

\* cited by examiner

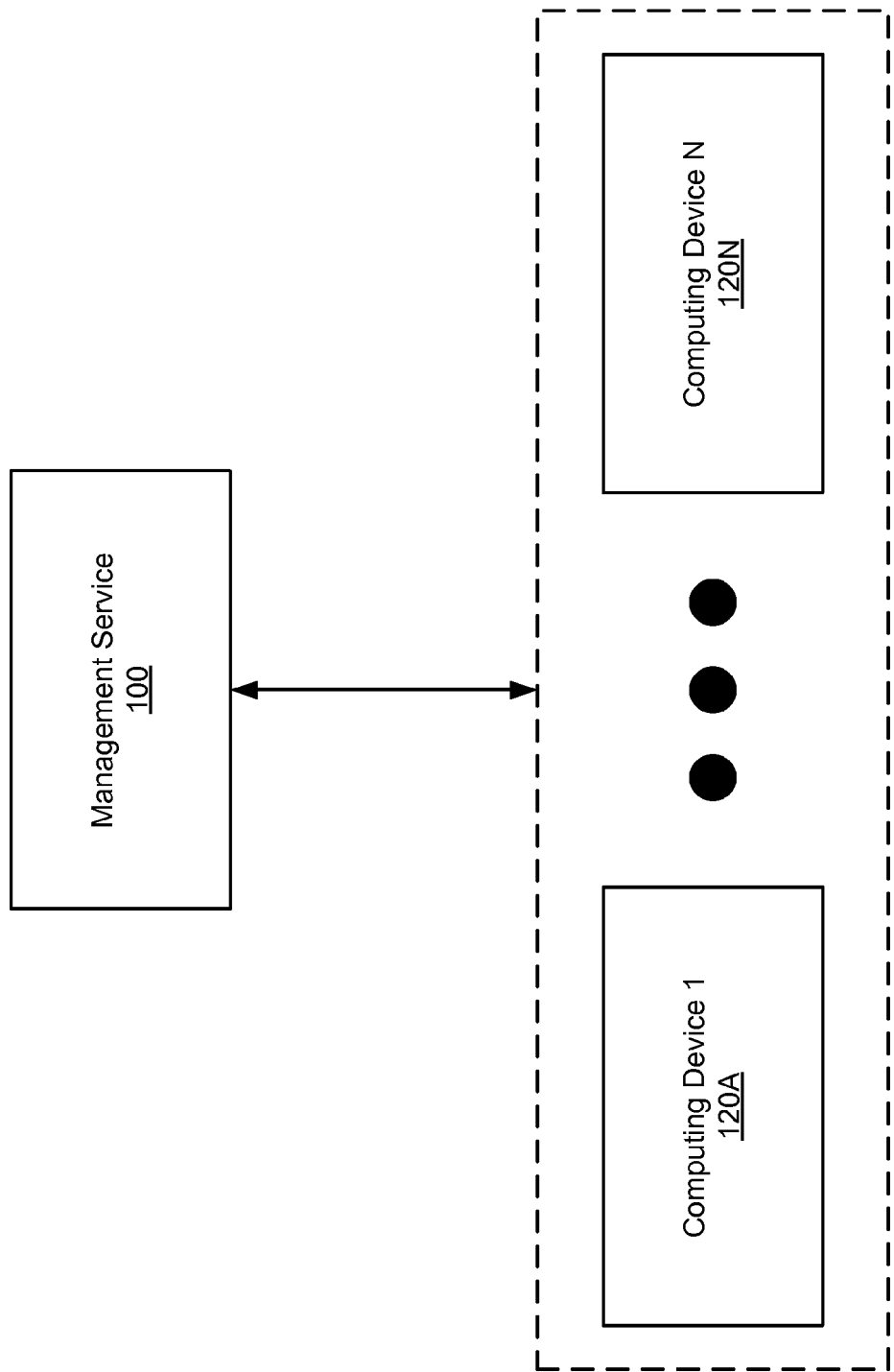

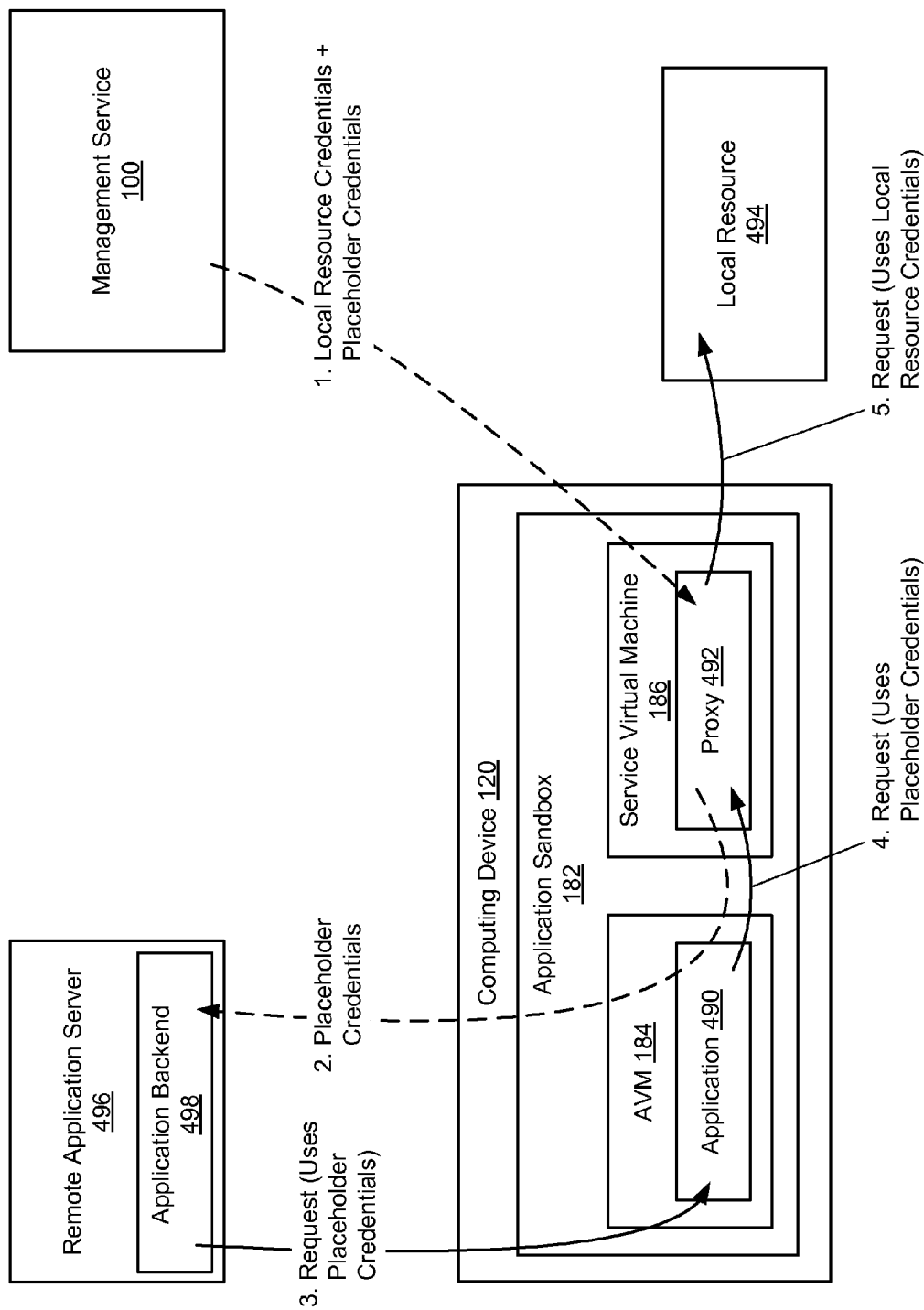

METHOD AND SYSTEM FOR PROTECTING CREDENTIALS

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Software applications may require credentials, such as passwords, in order to access credential-protected resources. The storage of these credentials within a software application, and/or the transmission of credentials between software modules of distributed software applications poses a security risk.

SUMMARY

In general, in one aspect, the invention relates to a method for accessing local resources. The method includes intercepting, by a proxy, a request from an application to access a local resource, where the application is executing in an application virtual machine (AVM) on a computing device and where the proxy is executing on a service virtual machine (SVM) on the computing device. The method further includes replacing, by the proxy, a placeholder credential in the request with a local resource credential to obtain a second request. The method also includes sending, by the proxy, the second request to the local resource, receiving, by the proxy, a response to the second request from the local resource, and providing the response to the application.

In general, in one aspect, the invention relates to a non-transitory computer readable medium comprising computer readable program code, which when executed by a computer processor enables the computer processor to, prior to intercepting a request, receive, by a proxy, a placeholder credential and a local resource credential from a management service, where the management service is external to a computing device, and where the proxy is executing on a service virtual machine (SVM) on the computing device, and provide, by the proxy, the placeholder credential to an application executing in an application virtual machine (AVM), where the AVM is executing on computing device, and where the local resource credential is not provided to the AVM. The computer readable program code further enables the computer processor to intercept, by the proxy, the request from the application to access a local resource, replace, by the proxy, the placeholder credential in the request with the local resource credential to obtain a second request, send, by the proxy, the second request to the local resource, receive, by the proxy, a response to the second request from the local resource, and provide the response to the application.

In general, in one aspect, the invention relates to a computing device. The computing device includes a server configured to provide at least one integrity measurement for the server to a management service. The server includes a first trusted platform module (TPM) and a service virtual machine (SVM) executing on the computing device and including a proxy, where the proxy is configured to intercept a request from an application to access a local resource, replace a placeholder credential in the request with a local resource credential to obtain a second request, send the second request to the local resource, receive a response to the second request from the local resource, and provide the response to the application. The server further includes an application virtual machine including the application.

Other aspects of the invention will be apparent from the following description and the appended claims.

BRIEF DESCRIPTION OF DRAWINGS

FIGS. 1A-1C show systems in accordance with one or more embodiments of the invention.

FIGS. 4A and 4B show systems in accordance with one or more embodiments of the invention.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to the protection of credentials, for example, user names and passwords, against unauthorized access. A software application, running on a computing device, may require credentials, for example, to access protected resources, such as access-protected file systems. Opportunities for a third party with malicious intent to gain access to the credentials may be minimized by withholding the credentials from the application, thereby isolating the credentials from the application. A proxy that manages the credentials in lieu of the application may enable the application to perform functions that require the credentials, without exposing the credentials to the application. Accordingly, the application may perform normally, without having access to the credentials, and may not pose a security risk, even when compromised, because the credentials are kept separate from the application.

Figure 1B:
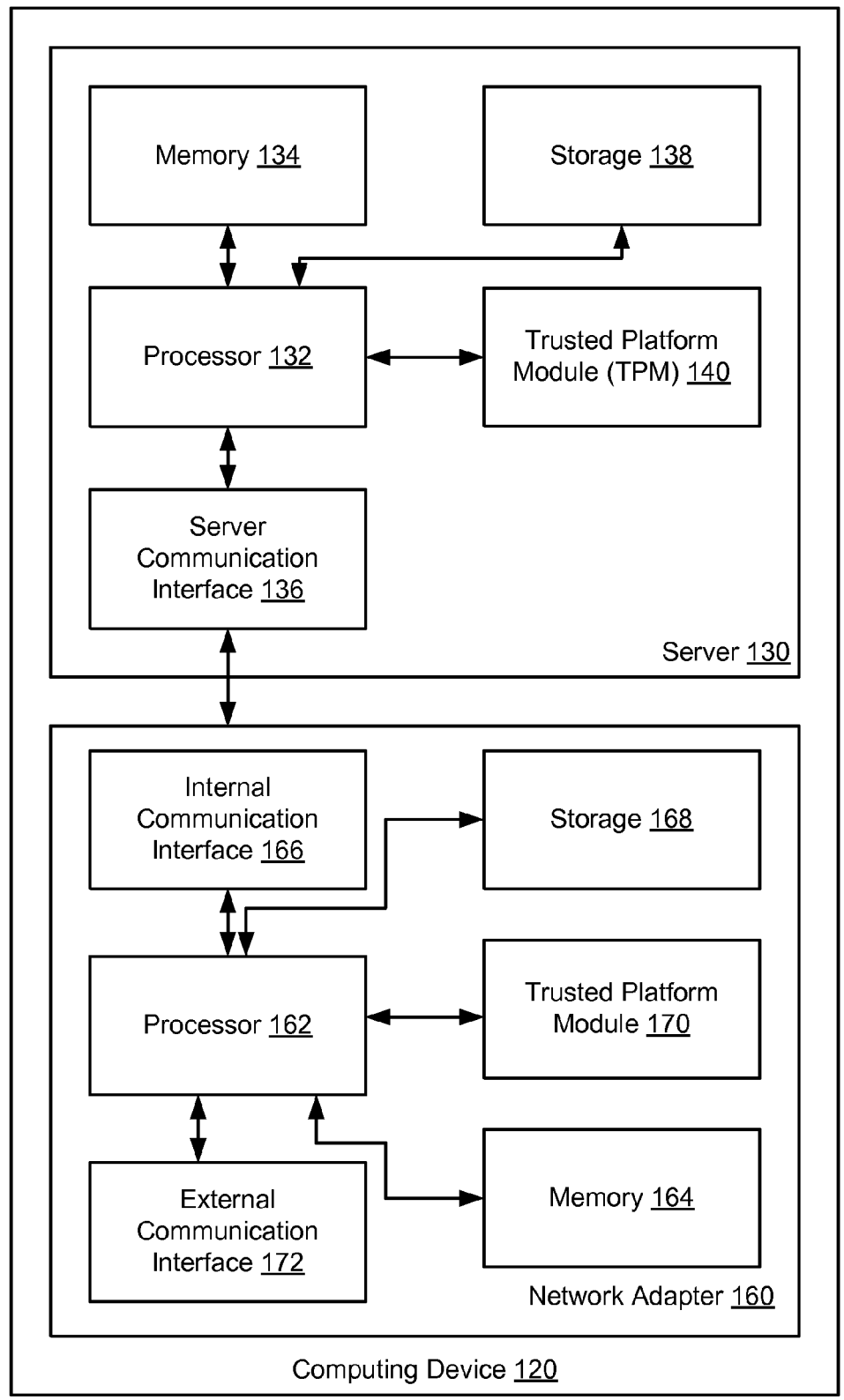

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 5 and 6).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

FIG. 1B shows a system in accordance with one or more embodiments of the invention. In one or more embodiments of the invention, computing device (120) includes two components: a server (130) and a network adapter (160). Each of these components is described below.

Figure 1C:
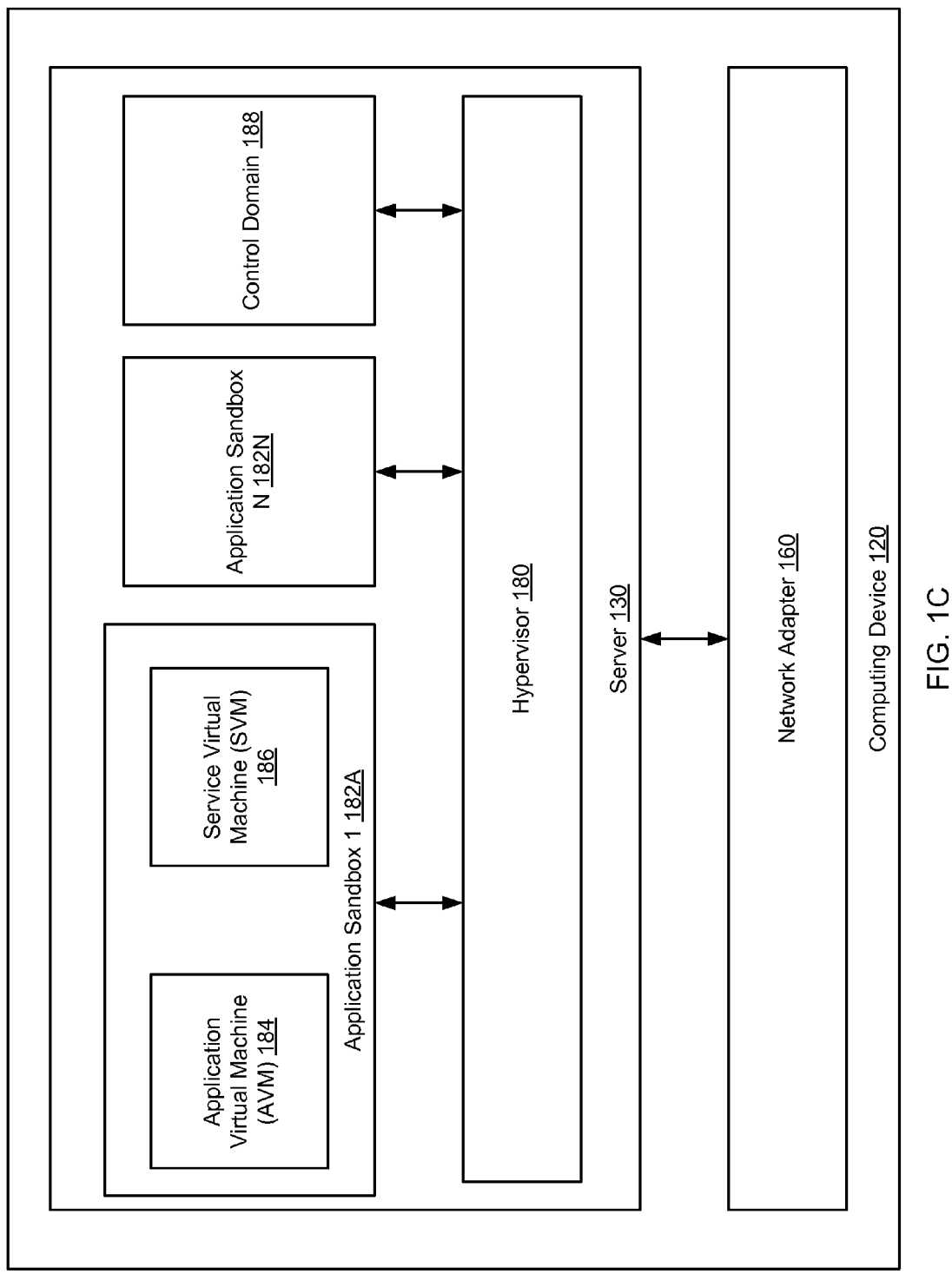

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain.

Additional details about the various proxy services are provided below (see e.g., FIGS. 4A and 4B).

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
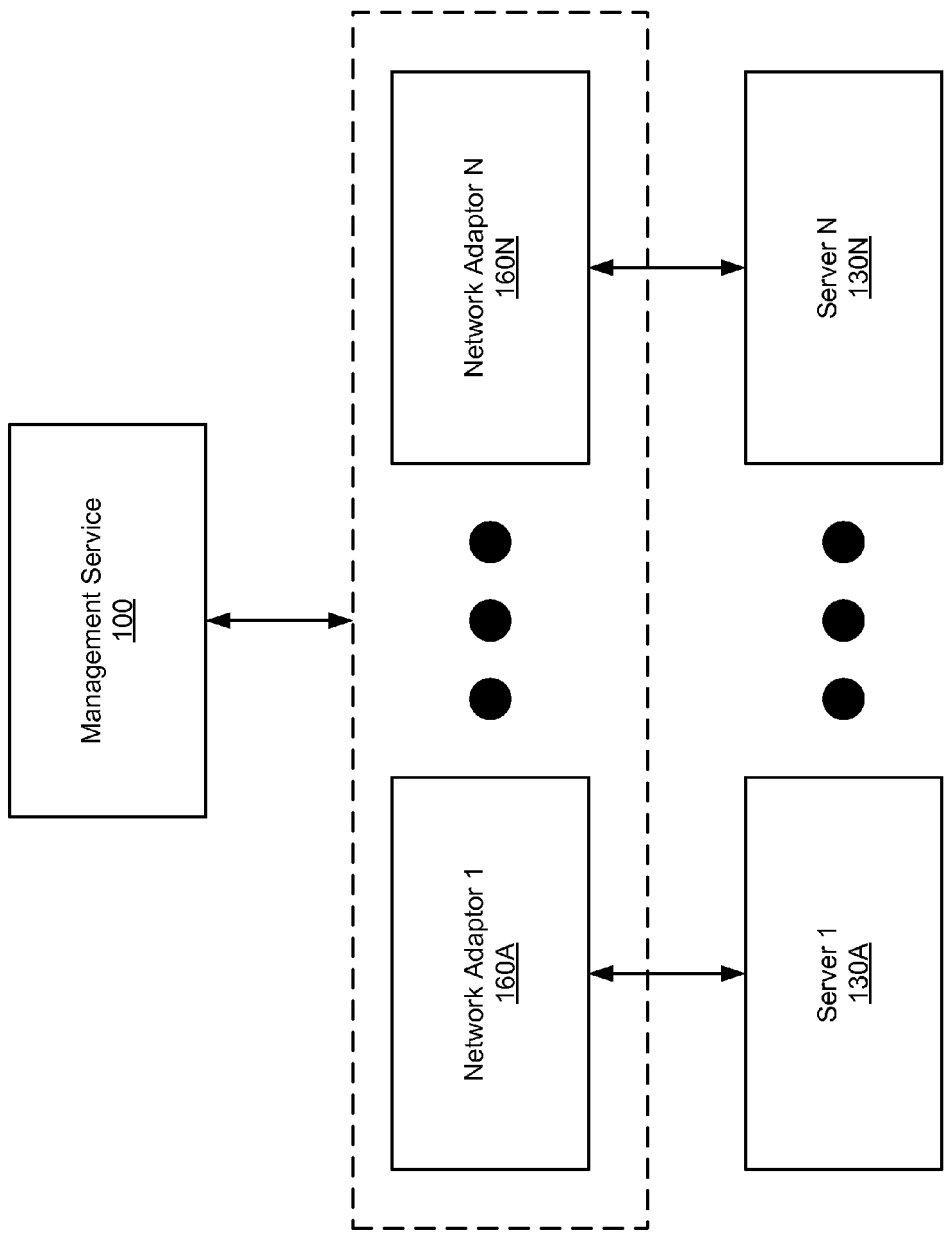
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
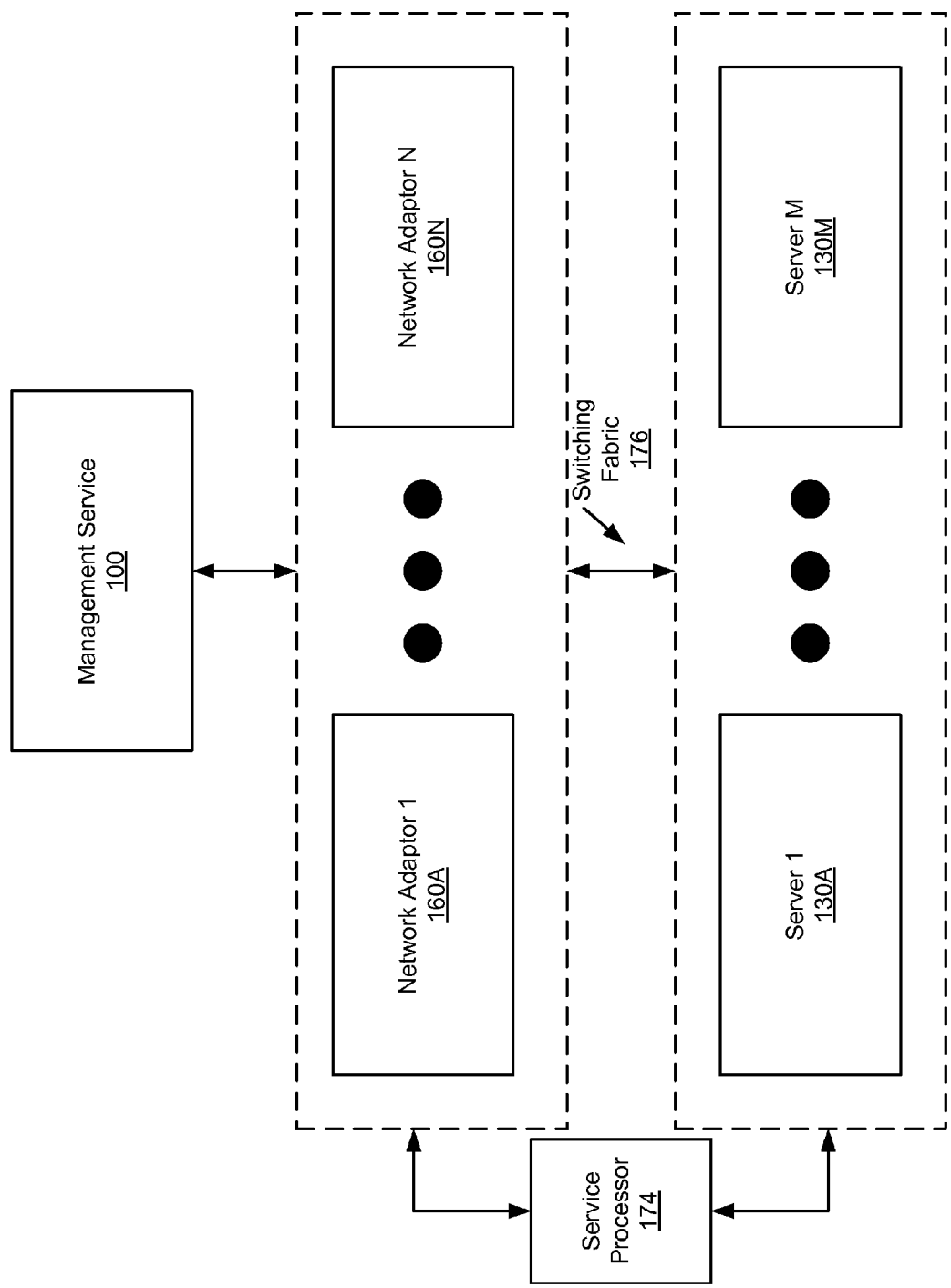
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may include an application running in an application virtual machine (AVM) (184) that needs to access a credential-protected local resource, further described below. The application running in the AVM (184) may therefore need to provide local resource credentials to the local resource, prior to being allowed to access the local resource.

In one embodiment of the invention, the local resource credentials are a piece of data that may be in any format, include any type of content (e.g., numbers, letters, symbols, etc.) and be of any length, e.g., a 128-bit value, 256-bit value, etc. The local resource credentials may be, for example, user names and/or passwords, or any other type of credentials used by authentication mechanisms, including Kerberos, LDAP, NTLM, etc. Further, in one embodiment of the invention, the validity of the local resource credentials may be limited. For example, the local resource credentials may be periodically rotated, and/or the local resource credentials may be valid for a single use only, similar to a one-time password.

In one embodiment of the invention, the local resource credentials used to gain access to the local resource are isolated from the application in order to reduce the risk of unauthorized access to the local resource credentials in case of a compromised application.

Figure 4A:
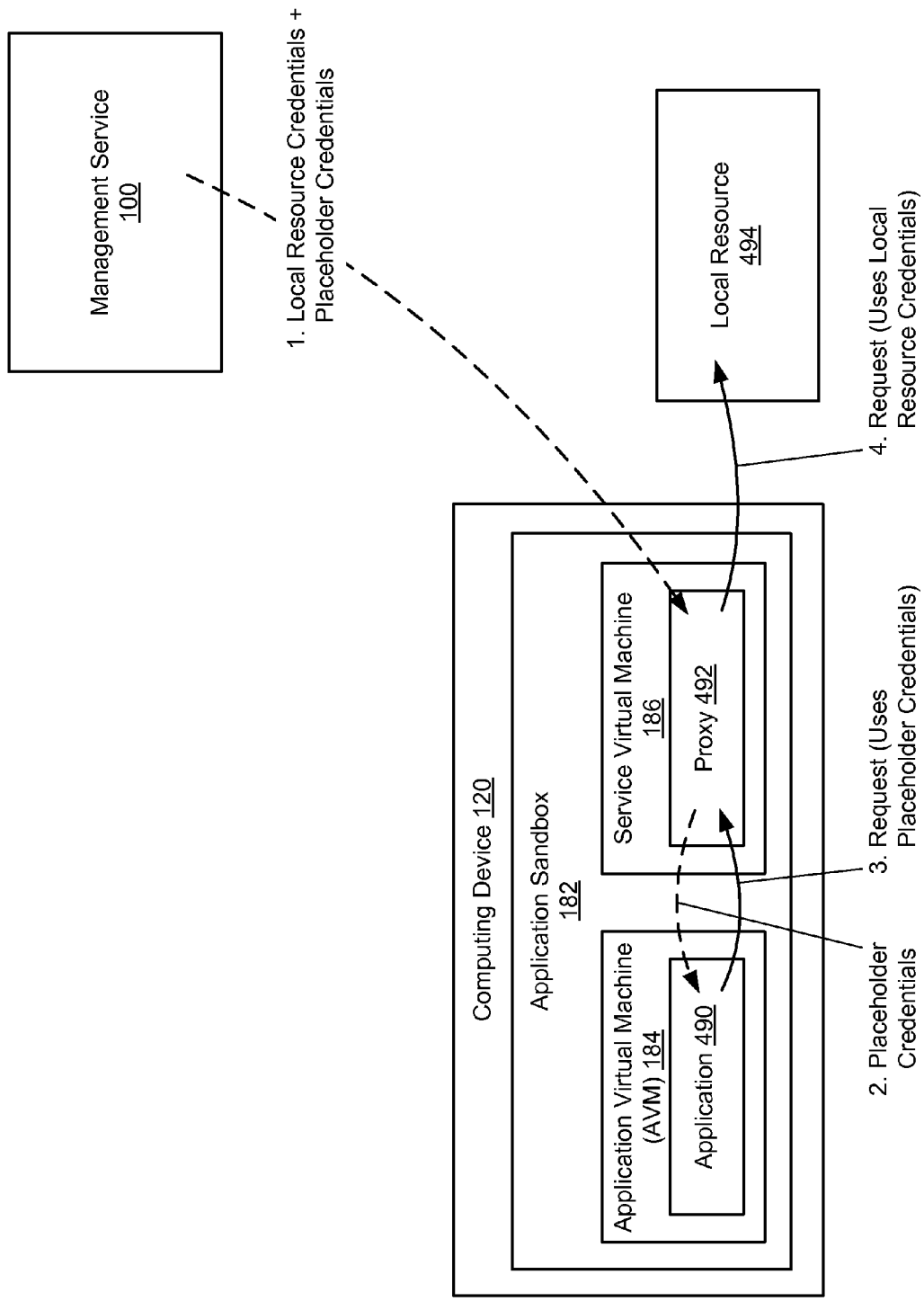

FIGS. 4A and 4B show various components of the system previously described in FIGS. 1A-3 that may be used to access a local resource using local resource credentials, in accordance with one or more embodiments of the invention. The other components of the system (while present) are omitted from FIGS. 4A and 4B for purposes of clarity.

Turning to FIG. 4A, in one embodiment of the invention, the AVM (184) hosts an application (490). The application (490) may be any set of machine-readable instructions suitable for execution within the AVM (184). The application (490) may be, for example, application software that a user interacts with, or a software agent that acts on behalf of another software application.

The embodiment shown in FIG. 4A further includes a local resource (494). The local resource (494) is any type of resource an application (490) may need to access, including non-volatile storage, communication interfaces, computing devices and/or services, etc. A local resource may be, for example, an HTTP or HTTPS resource, a file system resource (NFS, SMB, EXT, etc.), an SQL database, an FTP or SFTP resource, and SSH or SCP resource, a WebDAV resource, an iSCSI, FC or other storage protocol resource, etc. In one embodiment of the invention, a local resource may be remote, for example, the local resource may be a remote website requiring access credentials. In one embodiment of the invention, the local resource (494) is credential-protected, i.e., the application (490) attempting to access the local resource (494) is required to provide local resource credentials prior to obtaining access to the local resource (494). In one embodiment of the invention, the local resource (494) may be part of an enterprise's IT-infrastructure and may be under the control of the enterprise's IT administrator. Accordingly, the enterprise's IT administrator may be responsible for setting, updating, and distributing the local resource credentials required to access the local resource (494).

The embodiment shown in FIG. 4A further includes a proxy (492), hosted by the SVM (186). The proxy, in accordance with one embodiment of the invention, may be a set of machine-readable instructions suitable for execution within the SVM (186), designed to handle the local resource credentials. Accordingly, when the application (490), hosted by the AVM (184) requires access to the local resource (494), the proxy (492) may handle the local resource credentials in lieu of the application, as described in detail below, with reference to FIGS. 5 and 6, thus isolating the local resource credentials from the application (490)

Turning to FIG. 4B, the components shown are similar to the components shown in FIG. 4A. However, the embodiment shown in FIG. 4B also includes a remote application server (496) hosting an application backend (498).

The remote application server (496) is any combination of hardware and software that includes functionality to host a software application. More specifically, the remote application server (496) may include one or more servers (each including at least a processor, memory, persistent storage, and a communication interface), executing one or more software applications. The remote application server (496) may be remotely located and may be separated from the computing device (120) and the local resource (494) by an enterprise firewall (not shown).

In one embodiment of the invention, the remote application server (496) hosts an application backend (498). The application backend (498) may be any set of machine-readable instructions suitable for execution on the remote application server (496). The application backend (498) may be, for example, a cloud-based application that requires access to the local resource (494). In one embodiment of the invention, the local resource credentials are isolated from the application backend (498) in order to reduce the risk of unauthorized access to the local resource credentials as a result of a compromised application backend (498) and due to the potentially insecure communication link between the application backend (498) and the local resource (494). In the embodiment shown in FIG. 4B, the proxy (492) may handle the local resource credentials in lieu of the application, as described in detail below, with reference to FIGS. 5 and 6, when the application backend (498), hosted by the remote application server (496) requires access to the local resource (494).

In one or more embodiments of the invention, the management service (100), the computing device (120), and the remote application server (496), shown in FIGS. 4A and 4B may be remote to one another and may be connected by network infrastructure that may include, for example, routers, switches, wiring, etc. In one or more embodiments of the invention, any of these network infrastructure components may be compromised. Accordingly, any communication between any of the participating parties (i.e., the management service (100), the computing device (120), and the remote application server (496) may be intercepted or altered by third parties with malicious intent. Accordingly, in accordance with one embodiment of the invention, any communication between any of the participating parties may be encrypted if sensitive information, such as, for example, the credentials used for the authentication, are exchanged. In one embodiment of the invention, for example, public-private pairs of keys may be used to protect sensitive information. In one embodiment of the invention, communications may, however, need to be performed without or with limited encryption only, for example, in order to enable the enterprise firewall to inspect the communications. Accordingly, the communications between the application (690) and the application backend (698) may not be encrypted. Further, in accordance with one or more embodiments of the invention, any communication between any of the participating parties may be protected against tampering, in order to ensure that alterations of a communication by a third party with malicious intent are detected. In one embodiment of the invention, hash values may be used, for example, to verify that information transmitted between the management service (100), the computing device (120), and the remote application server (496) is genuine.

One skilled in the art will recognize that the architecture of a system is not limited to the components shown in FIGS. 1A-4B. For example, the system may include multiple computing devices, a computing device may include multiple application sandboxes, and an application sandbox may include multiple applications. A computing device with multiple application sandboxes may further include multiple proxies. In addition, a single proxy may be used to access multiple local resources that require either the same or different local resource credentials for authentication. The system may further include multiple remote application servers and multiple local resources.

Figure 5:
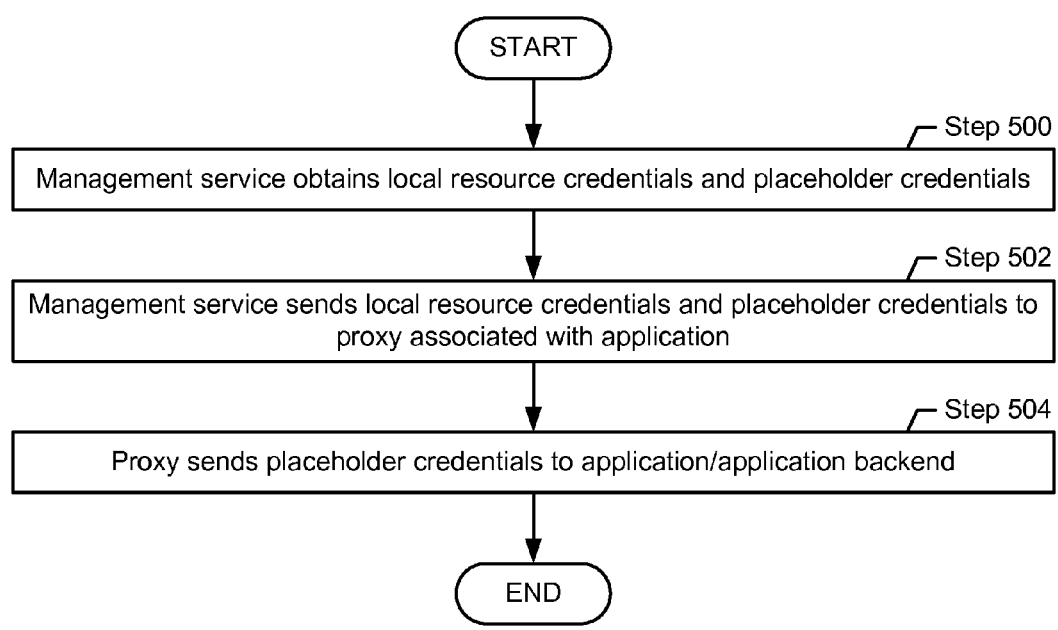
FIG. 5 shows a flowchart in accordance with one or more embodiments of the invention.
Figure 6:
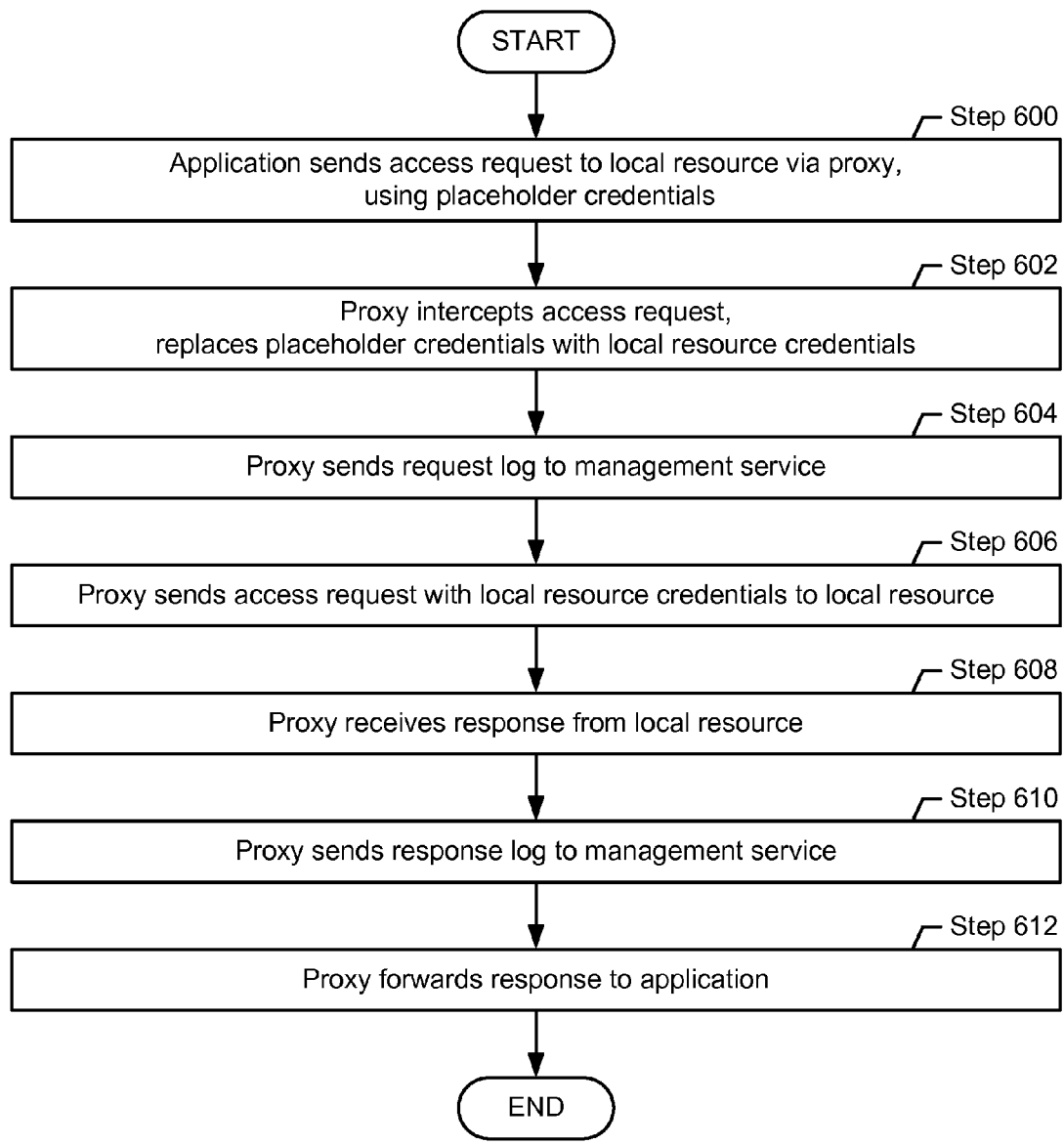
FIG. 6 shows a flowchart in accordance with one or more embodiments of the invention.

FIGS. 5 and 6 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one or more embodiments of the invention, the steps shown in FIGS. 5 and 6 may be performed in parallel with any other steps shown in FIGS. 3 and 4 without departing from the invention.

FIG. 5 shows a method for providing local resource credentials, required for accessing a local credential-protected resource, to a computing device, in accordance with one or more embodiments of the invention.

In one or more embodiments of the invention, the local resource may be configured to provide the currently valid local resource credentials to components of the systems shown in FIGS. 4A and 4B, thus enabling an application running on the computing device to access the local resource. In accordance with one or more embodiments of the invention, a prerequisite for executing the method described in FIG. 5, i.e., providing the local resource credentials to the computing device, is that the management service has verified the integrity of the computing device, including the application, as previously described.

In one or more embodiments of the invention, the method shown in FIG. 5 is performed before the application may connect to the local resource. The method shown in FIG. 5 may be performed, for example, after the management service has verified the integrity of the computing device. In addition the method may be performed periodically, for example, each time new local resource credentials are issued, for example, in cases where the local resource credentials are periodically rotated, or where the local resource credentials are one-time-use credentials. Depending on the configuration of the system, details of the steps performed may vary. These details are explained below, with reference to FIGS. 4A and 4B.

Turning to FIG. 5, in Step 500, the management service obtains the local resource credentials and placeholder credentials, further described below. In one embodiment of the invention, the local resource credentials may be obtained from the local resource, from a computing device affiliated with the local resource, or from the owner or administrator of the local resource. In one embodiment of the invention, if the local resource credentials are periodically rotated, the management service may obtain updated local resource credentials whenever the local resource credentials have changed.

The management service may obtain the placeholder credentials, for example, by generating the placeholder credentials. In one embodiment of the invention, placeholder credentials are invalid credentials that are not suitable for obtaining access to the local resource. Accordingly, while the local resource credentials may need to be isolated from the application in order to protect the local resource credentials (and the local resource) from unauthorized access in case of a compromised application, the placeholder credentials may be provided to the application without compromising the security of the local resource. The application may use the placeholder credentials in order to submit a request to access the local resource, without having access to the local resource credentials. An unauthorized clone of the application, obtained by a third party in order to access the local resource, may therefore be prevented from accessing the local resource because the unauthorized clone only includes the placeholder credentials but not the local resource credentials. In one embodiment of the invention, placeholder credentials are pieces of data, different from the local resource credentials, that may be in any format, include any type of content (e.g., numbers, letters, symbols, etc.) and be of any length, e.g., a 128-bit value, 256-bit value, etc. The placeholder credentials may be in a format similar to the format being used for the corresponding local resource credentials. For example, if the local resource credentials include a user name and a password, the placeholder credentials may include a user name different from the user name included in the local resource credentials, and/or a password different from the password included in the local resource credentials.

In one embodiment of the invention, there is a 1:1 mapping between placeholder credential and local resource credential. In such scenarios, if the local resource credential is periodically rotated, and/or the local resource credential is only valid for a single use only, then the corresponding placeholder credential may have similar properties. For example, if the local resource credential may only be used once, then the corresponding placeholder resource may only be used once. After they are used, a new local resource credential and a corresponding new placeholder credential is obtained in order to enable future access to the local resource.

In another embodiment of the invention, the placeholder credential(s) for a given application may remain static while the local resource credentials may be changed in a manner that is transparent to the application. For example, consider a scenario in which the local resource credential may only be used for one hour after which it becomes invalid and a new local resource credential must be obtained in order to access the local resource. In such scenarios, the application may be provided with a single placeholder credential and the proxy may maintain a mapping between the placeholder credential and the local resource credential. When a given local resource credential expires, the proxy may obtain a new local resource credential and update its internal placeholder credential to local resource credential mapping to include the new local resource credential. Thus allows the application to continue to use the placeholder credential regardless of which local resource credential that is ultimately being used to replace the placeholder credential in the request to the local resource.

In Step 502, the management service sends the local resource credentials and the placeholder credentials to the proxy associated with the application that requires access to the local resource (see e.g., dashed arrows (1) in FIGS. 4A and 4B). In one embodiment of the invention, only the proxy associated with the application that requires access to the local resource, but no other proxy, whether hosted by the computing device itself or elsewhere, may receive the local resource credentials and the placeholder credentials. In one embodiment of the invention, encryption may be used to protect the transmission of the credentials.

In Step 504, the proxy sends the placeholder credentials, but not the local resource credentials, to the application (see e.g., dashed arrow (2) in FIG. 4A). In embodiments where the application interfaces with an application backend that uses credentials to request access to the local resource, the application forwards the placeholder credentials, but not the local resource credentials, to the application backend (see e.g., dashed arrow (2) in FIG. 4B). Completion of Steps 500-504 distributes local resource credentials and placeholder credentials, as necessary, to enable the application or the application backend to request access to the local resource, as further described below with reference to FIG. 6.

FIG. 6 shows a method for accessing a local credential-protected resource. The method may be executed when an application hosted by an AVM on a computing device requires access to the local resource. The method may also be executed when a remote application backend hosted by a remote application server requires access to the local resource. Prior to performing the steps shown in FIG. 6, the method described in FIG. 5 must have been completed.

Turning to FIG. 6, in Step 600, the application requiring access to the local resource directs an access request to the local resource via the proxy (see e.g., solid arrow (3) in FIG. 4A). If the application interfaces with an application backend, the application backend may send the access request to the application (see e.g., solid arrow (3) in FIG. 4B), and the application may forward the access request to the local resource via the proxy (see e.g., solid arrow (4) in FIG. 4B). In one or more embodiment of the invention, the access request includes the placeholder credentials that are affiliated with the local resource credentials necessary to access the local resource.

In Step 602, the proxy intercepts the access request received from the application and selects the local resource credentials corresponding to the received placeholder credentials, e.g., using a mapping. Subsequently, the proxy replaces the placeholder credentials in the request received from the application with the local resource credentials. The credentials inserted by the proxy may be, for example, SSH credentials in case of an SSH local resource, or any other type of credentials required by the protocol used to access the local resource. In one embodiment of the invention, the proxy may perform the credential substitution described above for multiple local resources. Each local resource may require unique local resource credentials, and each set of local resource credentials may be affiliated with a unique set of placeholder credentials. Accordingly, the proxy may be able to identify the local resource the application intends to access, based on the placeholder credentials received from the application. In one embodiment of the invention, the proxy may further upgrade the protocol used for the access request to protect the local resource credential being transmitted. For example, the proxy may receive an access request directed to a local resource that is a web server, via Hypertext Transfer Protocol (HTTP), including placeholder credentials. The proxy may then, after substituting the placeholder credentials with the local resource credentials, use HTTP Secure (also referred to as HTTP over Transport Layer Security (TLS) or HTTP over Secure Socket Layer (SSL)) to transmit the access request to the local resource, as further described below with reference to Step 606. In another scenario, the local resource may be a file system, and the proxy may receive an access request that is based on the network file system (NFS) protocol. The request received by the proxy may be an NFSv2 request, and the proxy may upgrade the request to the NFSv3 protocol. In one embodiment of the invention, the credential substitution and/or protocol augmentation performed by the proxy is transparent to the application sending the request to the proxy, i.e., the application may be unaware of the credential substitution and/or the protocol augmentation.

In Step 604, the proxy sends a request log message to the management service. In one embodiment of the invention, the request log message may include information about the request made by the application or by the application backend via the application, including, for example, the name of the application requesting access to the local resource, date and time the request was made, etc.

In Step 606, the proxy sends the access request with the local resource credentials to the local resource (see e.g., solid arrow (4) in FIG. 4A and solid arrow (5) in FIG. 4B). As previously discussed, the access request may use a secure communication protocol (e.g., HTTPS) in order to protect the local resource credentials during transmission. The local resource may verify the received local resource credentials and may accept the access request if the received local resource credentials are correct.

In Step 608, the proxy receives a response from the local resource. The response may include, for example, an acknowledgement of the access request. If the access request included a request for data, the response may also include the requested data.

In Step 610, the proxy sends a response log message to the management service. In one or more embodiments of the invention, the response log message may include information about the response provided by the local resource, including, for example, a documentation of the data provided in response to the access request, date and time the response was received, etc.

In Step 612, the proxy forwards the response to the application. If the original response was made by an application backend, hosted by a remote server, the application may forward the response to the application backend. In one embodiment of the invention, the response may include the requested data.

Embodiments of the invention may enable a local and/or remote software application to safely access a credential-protected local resource. The credentials required for accessing the local resource may be isolated from the software application by a proxy that substitutes placeholder credentials provided by the software application with the appropriate local resource credentials needed to access the local resource. Accordingly, a compromised application may not leak the credentials to a third party with malicious intent. In cases where a remote application backend requires access to the local resource, interception of the communication between remote application backend and local resource may also not reveal the credentials.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing local resources, comprising:
   prior to intercepting a request:
      receiving, by a proxy that is executing in a service virtual machine (SVM) on a computing device, a placeholder credential and a local resource credential from a management service, wherein the management service is external to the computing device; and
      providing, by the proxy, the placeholder credential to an application that is executing in an application virtual machine (AVM) on the computing device, wherein the local resource credential is not provided to the AVM;
   intercepting, by the proxy, the request from the application to access a local resource;
   replacing, by the proxy, the placeholder credential in the request with the local resource credential to obtain a second request;
   sending, by the proxy, the second request to the local resource;
   receiving, by the proxy, a response to the second request from the local resource; and
   providing the response to the application.

2. The method of claim 1, further comprising:
   prior to receiving the placeholder credential and the local resource credential from the management service:

providing at least one integrity measurement for the computing device to the management service.

3. The method of claim 2, wherein the at least one integrity measurement for the computing device comprises an integrity measurement generated by a server in the computing device, wherein the AVM and the SVM are executing on the server.

4. The method of claim 2, wherein the at least one integrity measurement for the computing device comprises an integrity measurement generated by a network adaptor in the computing device.

5. The method of claim 1, wherein the placeholder credential is generated by the management service.

6. The method of claim 1, further comprising:
prior to intercepting the request:
providing at least one integrity measurement for the computing device to a management service, wherein the management service is external to the computing device.

7. The method of claim 6, wherein the at least one integrity measurement for the computing device comprises an integrity measurement generated by a server in the computing device, wherein the AVM and the SVM are executing on the server.

8. The method of claim 6, wherein the at least one integrity measurement for the computing device comprises an integrity measurement generated by a network adaptor in the computing device.

9. The method of claim 1, further comprising:
prior to intercepting the request:
providing, by the application, the placeholder credential to an application backend executing on a remote application server, wherein the computing device is operatively connected to the remote application server;
receiving, by the application, the request to access the local resource from the application backend, wherein the request comprises the placeholder credential; and
sending, by the application, the request to the local resource.

10. The method of claim 1, wherein the local resource credential is only valid for the application executing on the computing device.

11. The method of claim 1, wherein the local resource credential is only valid for a finite duration.

12. The method of claim 11, wherein the placeholder credential is only valid for the finite duration.

13. The method of claim 1, wherein the local resource is executing on a second computing device.

14. The method of claim 1, wherein the request is a request that conforms to Hypertext Transfer Protocol (HTTP).

15. The method of claim 14, wherein the second request is a request that conforms to HTTP Secure (HTTPS).

16. The method of claim 1, further comprising:
prior to sending the second request: sending, by the proxy, a request log message comprising information associated with the second request to the management service; and
prior to sending the response: sending, by the proxy, a response log message comprising information associated with the response to the management service.

17. A non-transitory computer readable medium comprising computer readable program code, which when executed by a computer processor enables the computer processor to:
prior to intercepting a request:
receive, by a proxy, a placeholder credential and a local resource credential from a management service, wherein the management service is external to a computing device, and wherein the proxy is executing on a service virtual machine (SVM) on the computing device;
provide, by the proxy, the placeholder credential to an application executing in an application virtual machine (AVM), wherein the AVM is executing on computing device, and wherein the local resource credential is not provided to the AVM;
intercept, by the proxy, the request from the application to access a local resource;
replace, by the proxy, the placeholder credential in the request with the local resource credential to obtain a second request;
send, by the proxy, the second request to the local resource;
receive, by the proxy, a response to the second request from the local resource; and
provide the response to the application.

18. A computing device, comprising:
a server configured to provide at least one integrity measurement for the server to a management service, wherein the server comprises:
an application virtual machine (AVM) comprising an application;
a service virtual machine (SVM) executing on the computing device and comprising a proxy, wherein the proxy is configured to:
prior to intercepting a request:
receive, a placeholder credential and a local resource credential from the management service, wherein the management service is external to the computing device; and
provide the placeholder credential to the application that is executing in the AVM on the computing device,
wherein the local resource credential is not provided to the AVM;
intercept a request from the application to access a local resource;
replace the placeholder credential in the request with the local resource credential to obtain a second request;
send the second request to the local resource;
receive a response to the second request from the local resource; and
provide the response to the application.

19. The computing device of claim 18, further comprising:
a network adaptor operatively connected to the server comprising a trusted platform module (TPM),
wherein the network adaptor is configured to provide at least one integrity measurement for the network adaptor to the management service prior to the computing device intercepting the request.

* * * * *